United States Patent [19]
Jorgensen et al.

[11] 3,721,950
[45] March 20, 1973

[54] RESPONSIVE NAVIGATION BEACON

[75] Inventors: Stig. W. Jorgensen, Hollis, N.H.; Wayne A. Kearsley, Chelmsford, Mass.

[73] Assignee: Sanders Associates, Inc., Nashua, N.H.

[22] Filed: Aug. 13, 1969

[21] Appl. No.: 866,406

[52] U.S. Cl.................340/3 E, 340/6 R, 343/6.8 R, 343/18 C, 343/106 R
[51] Int. Cl...............................................G01s 3/00
[58] Field of Search......343/6.8 R, 106 R, 6.5 R, 6.5 LC, 343/6.8 LC, 18 B, 18 C; 340/3 E, 5 R, 6 R, 2, 16 C, 8 FT; 356/141, 152

[56] References Cited

UNITED STATES PATENTS

| | | | |
|---|---|---|---|
| 2,823,365 | 2/1958 | Rines | 343/18 B |
| 3,574,466 | 4/1971 | Peters | 356/152 |
| 2,297,395 | 9/1942 | Erben | 343/106 R |
| 2,792,570 | 5/1957 | Stewart | 343/106 R |
| 1,932,065 | 10/1933 | Corey et al. | 343/106 R |
| 3,213,410 | 10/1965 | Hagemann | 340/3 E |
| 3,258,737 | 6/1966 | Ciavaglia | 340/5 R |

Primary Examiner—Richard A. Farley
Attorney—Louis Etlinger

[57] ABSTRACT

A navigation beacon is provided which does not emit a continuous signal. Instead, it has a pair of responsive devices rotating at different angular velocities related in the ratio 2:1. The responsive devices may be either passive reflectors or active transponders, and the signal may be subsonic, sonic, or supersonic acoustic energy, or infrared, visible, ultraviolet or microwave radiation or combinations of any of these forms of energy. In any case, an observer having any bearing relative to the beacon will receive two distinct responses from the pair of reflectors or transponders. The time interval between these two responses will be a calculable function of that bearing. In addition, the interval between interrogation and response will be a calculable function of the observer's range from the beacon. Various refinements may be added to make the beacon easier to locate for friendly forces, or to make it difficult for enemy forces to locate. The beacon can even be turned off entirely except when activated by a predetermined command and the command can be in coded form to prevent activation by an enemy.

4 Claims, 14 Drawing Figures

PATENTED MAR 20 1973 3,721,950

INVENTOR
STIG W. JORGENSEN
WAYNE A. KEARSLEY
BY
ATTORNEY

INVENTOR
STIG W. JORGENSEN
WAYNE A. KEARSLEY
BY
ATTORNEY

INVENTOR.
STIG W. JORGENSEN
WAYNE A. KEARSLEY
BY Robert F. Van Epps

INVENTOR.
STIG W. JORGENSEN
WAYNE A. KEARSLEY

RESPONSIVE NAVIGATION BEACON

FIELD OF THE INVENTION

This invention relates to navigation beacons generally. It has application to land or marine environments; it can be used with various forms of energy including sound, light, and radar; and it is particularly applicable to an underwater acoustic device for underwater demolition and oceanographic activities.

THE PRIOR ART

In U.S. Pat. No. 2,297,395 of Erben there is described a navigation beacon comprising two narrow beam radio transmitters which broadcast at different frequencies and are both continuously rotated about a vertical axis so that their beams are swept in azimuth. One of the beams is swept at an angular velocity of omega, and the other at an angular velocity of one-half omega. An observer with a radio receiver located at any compass bearing relative to the radio beacon just described will detect two different frequency pulses, one for each of the rotating beams. The beams start out in alignment with each other when both are pointing north. Thereafter, they diverge at an angle which increases as they continue to rotate at their unequal angular velocities; i.e., the angular divergence between the two beams will be small for small displacements from north, and become larger as the displacement from north increases. Thus, the angular displacement between the two beams provides an indication to an observer of his compass bearing relative to the beacon. If the angular velocity omega is known, this displacement may be deduced from the time interval between the two pulses, and the difference in frequency between the two pulses enables the observer to distinguish between them. In this way, the beacon gives the observer an indication of his bearing relative thereto.

The prior art beacon just described has a number of disadvantages. For one thing, it gives only bearing information and does not disclose range. Secondly, the beacon has a pair of transmitters which must operate continuously and therefore consume significant amounts of power. This, in turn, requires access to a power line, or frequent battery replacement, if the operating life of the beacon is to be substantial. In other words, the Erben beacon is not well adapted for use in locations which are difficult to supply with electric power lines, or which are difficult to reach for the purposes of replacing battery power sources. There are many relatively inaccessible locations on land, such as desert, mountainous, or jungle environments, and in marine environments particularly the power requirement would make the Erben beacon unsuitable for surface buoys and especially for underwater applications. The latter requirement is becoming particularly prominent at the present time, because of the present growth of various oceanographic activities, and the need to maintain an underwater demolition capability for both peaceful and defensive reasons.

In addition, the Erben beacon system requires that all the expensive radio transmission equipment be concentrated in the beacon itself, which is inconsistent with the concept that a beacon should preferably be a small inexpensive package, and for certain applications should be expendable. A particularly good example is an underwater beacon, which is often left in place after its job is done.

Furthermore, the requirement for two distinct transmission frequencies increases the cost by adding to the amount of transmitter circuitry. Finally, the Erben type of beacon, because of the fact that it broadcasts continuously, announces its presence and its location to friend and foe alike, and is therefore unsuitable for some military applications which require a high level of security.

SUMMARY AND OBJECTS OF THE INVENTION

The principal objects of the present invention are to provide an improved beacon which provides a positive indication of range, which achieves a better functional and cost distribution as between the beacon and the observer equipment, and which can be made secure for military applications.

The invention follows the basic prior art approach of rotating two different objects at different angular velocities so that their relative angular spacing is a function of their instantaneous angular position relative to a reference line. It differs from the prior art in the way that the beacon communicates this angular position to an observer. In the present system, the two objects rotated at different speeds are responsive devices, either passive reflectors or transponders, rather than continuous transmitters. Either type of device has an axis of colinear response. In the case of a reflector, it is the axis of reflection. In the case of a transponder, such a device can be arranged both to receive and to transmit with a high degree of directionality so that the transponder is turned on, and transmits a brief narrow beam response along a given path, only when it is triggered by reception of an interrogating signal arriving along the same narrow path, which is the axis of colinear response of the transponder. In either case, there is no requirement for two different frequencies.

Microwave (i.e., radar), visible light, infrared or ultraviolet radiation can be used in an air environment over land or on the surface of a body of water, and in an underwater environment acoustic pulses of sonic, subsonic or supersonic frequency can be used. For security reasons, the latter type of beacon may be provided with an omni-directional hydrophone which responds to a turn-on signal to initiate rotation of the transponders, and the beacon may include decoding equipment so that only a predetermined code will be effective. After being turned on, the beacon may operate only for a predetermined time interval, or it may be turned off in response to a second signal, which again may be coded. In either event, when the beacon is off, it gives no indication of its presence to an enemy.

All the foregoing approaches have the advantage over prior art devices that they inherently give a range indication. The reflective embodiment does so by virtue of the echo time. The transponder approach similarly indicates range by means of the response interval. In addition, the passive reflective type of beacon achieves a better functional and cost distribution because the expensive, continuously operating, high power-consuming transmitting equipment is borne by the observer and is not built into the small, inaccessible, and often expendable beacon. Even in the case of the transponder type of device, the energy requirement and the cost factor is much less because of the fact that the transmitting function of the transponders involves an extremely low duty cycle compared to the continuous transmission of the prior art. Finally, the invention involves a high degree of security because the beacon can be operated with non-visible radiation, and can be made to respond only to a friendly command transmitted by means of a highly directional beam. As a result, the beacon does not announce its presence to an enemy and can be rendered absolutely quiet when not in use.

As will become clear from the following discussion, all these advantages are made possible by the basic insight of substituting responsive (i.e., passive reflective or transponding) devices for the continuous duty cycle transmitters of the prior art.

BRIEF DESCRIPTION OF THE DRAWING

FIGS. 10(A) through (D) are a series of diagrams of responses versus time obtained with the beacon of this invention, for compass bearings of 90°, 180°, 270° and 360° respectively.

FIGS. 11(A) through (D) are a series of diagrams, interspersed and matched with FIGS. 10(A) through (D) respectively, showing the time intervals between consecutive responses, for those same compass bearings.

DETAILED DESCRIPTION OF THE PREFERRED EMBODIMENT

Figure 1:
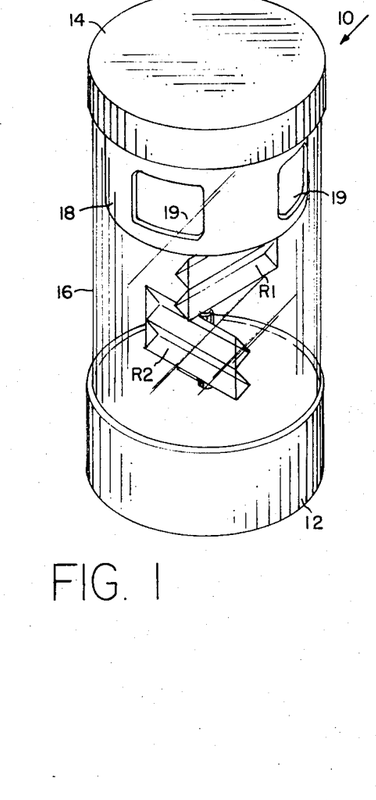
FIG. 1 is a perspective view of a responsive beacon in accordance with this invention, specifically a passive type of beacon for use with microwave radiation.

The beacon 10 of FIG. 1 is a passive reflective device capable of operating in the microwave (radar) region of the spectrum, although the same principles apply with any type of radiation that can be focused into a directional beam and reflected back directionally, including infrared, visible, and ultraviolet radiation. The beacon can be mounted upon a floating buoy for marine applications, or installed at any land location where bearing information may be needed. The beacon 10 is enclosed within an upright, generally cylindrical package, the lower portion of which comprises a housing 12 which contains a constant speed motor and gear train mechanism, a battery to power the motor, and a compass mechanism for directional orientation. The upper part of the beacon is covered by a top 14, while the central portion is enclosed by a 360° cylindrical shield 16 made of some material which will protect the interior mechanism from the effects of weather and ambient moisture and dirt, but which is transparent to the radiation with which the beacon 10 is to be used. Glass, for example, would be quite suitable for use in the visible light or microwave regions of the spectrum.

Figure 2:
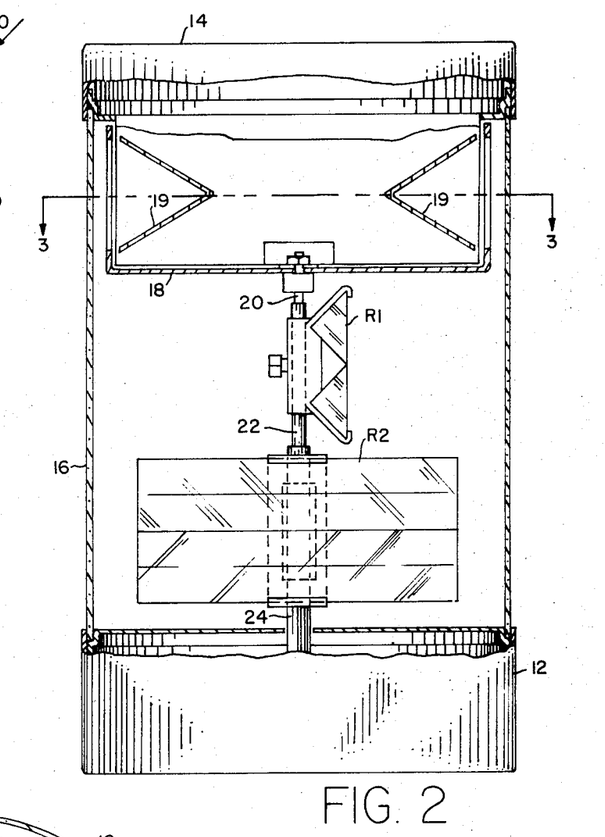
FIG. 2 is an elevational view, with parts broken away and sectioned for clarity of illustration, of the beacon of FIG. 1.
Figure 3:
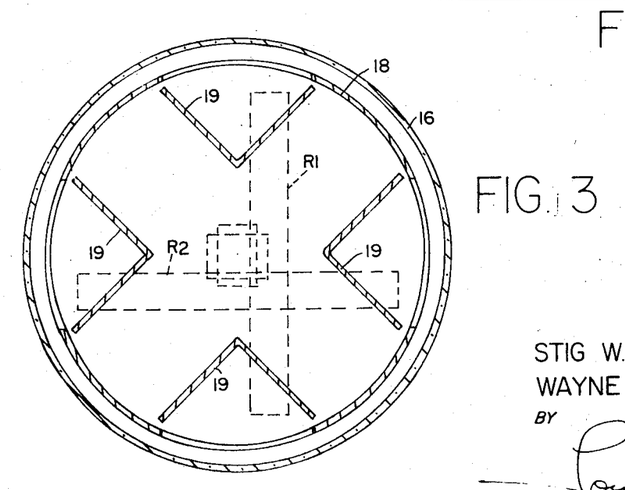
FIG. 3 is a sectional view taken along the lines 3—3 of FIG. 2.

Just below the top 14 is a drum 18 comprising four microwave corner reflectors 19 spaced about its periphery. Immediately below the drum 18 are a pair of microwave wedge reflectors R1 and R2. The drum 18 with its corner reflectors 19 and the two wedge reflectors R1 and R2 are all rotated about a vertical axis by means of drive shafts emerging vertically from the housing 12 and driven by the motor and gear train therein.

Specifically, there are three concentric drive shafts, 20, 22 and 24, driven at different speeds by the gear train. The innermost shaft 20 rotates the drum 18 at a speed selected so that an incident signal, for example visible light or a radar beam strikes a succession of corner reflectors 19. Each of these corner reflectors has a reflection characteristic very similar to that of a flat plate of comparable size, but has the advantage of accepting incident radiation from a wider cone of angles of incidence. An observer can locate the beacon 10 by sweeping a light beam or radar beam across the area where the beacon is thought to be. When the beam strikes the beacon, the succession of corner reflectors 19 will produce a pulsating reflection detectable by the observer, who will then know that the beam is aimed at the beacon.

Once the observer has thus located the beacon 10, he interrogates it by keeping the light or radar beam aimed at the beacon for several cycles of rotation of the wedge reflectors R1 and R2. The wedge reflectors also have reflection characteristics similar to a flat plate, but accept a wider vertical sector of angles of incidence. Thus, the light or radar beam can be incident upon the beacon 10 from somewhat above or below the horizontal, but will still be reflected back to the observer. On the other hand, the angle of acceptance and colinear reflection of the wedge reflectors R1 and R2 is highly directional in the horizontal plane so as to define as precisely as possible the azimuth or compass bearing of the observer relative to the beacon.

Figure 4A:
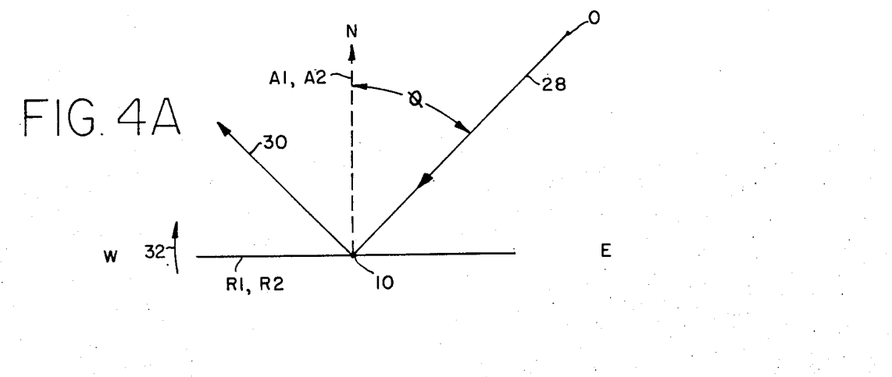
FIGS. 4a, b and c are a sequence of three diagrams illustrating the reflection angles at consecutive stages of operation of the beacon of the previous figures.
Figure 4B:
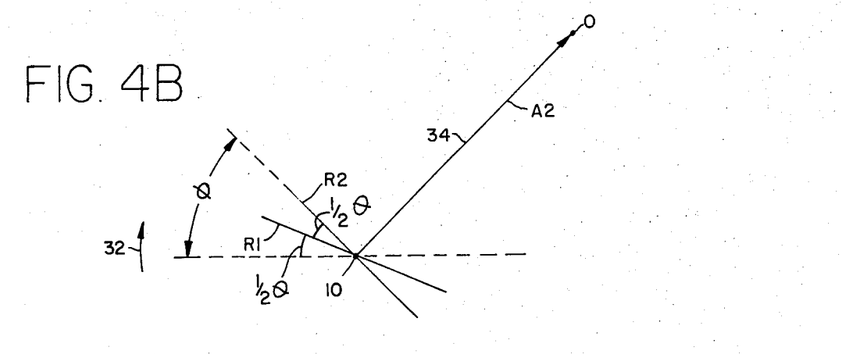
Figure 4C:
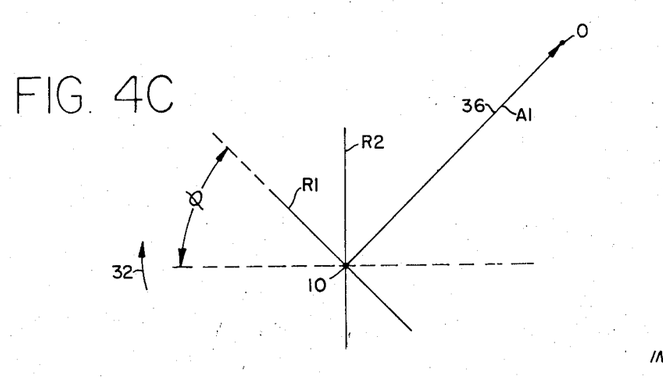

FIGS. 4A through 4C illustrate how the mechanism of the previous figures operates to inform an observer of his relative bearing. Each of the reflectors R1 and R2 has what may be termed an "axis of colinear response". Every reflector has a reflecting face, in the case of a planar surface, or an effective reflecting face in the case of the wedge reflectors R1 and R2. The reflecting face defines an imaginary line which is normal to that face. The familiar law of reflection is that the angle of incidence, formed by the path of the incident beam and the normal line, is equal to the angle of reflection, formed by the path of the reflected beam and the same normal line. In one special case, when the angles of incidence and reflection are zero, the path of the incident beam and the path of the reflected beam coincide with each other and with the normal line. Therefore, the normal line may be regarded as the axis of colinear response, i.e., the line along which the reflector reflects the incident beam back over the same path on which it arrived.

Although the two reflectors R1 and R2 rotate at different speeds, at regular intervals they will reach a condition in which they are momentarily pointing in the same direction. The function of the compass within housing 12 is to make sure that when this condition occurs the reflectors are facing in a known direction, e.g., north. Such a situation is depicted in FIG. 4A where it is seen that the lines R1 and R2, which diagrammatically represent the effective reflective faces of those reflectors, coincide and are oriented in an east-west direction (indicated by letters E and W). It follows then that the lines normal to these reflecting faces, i.e., their respective axes of reflection A1 and A2, will both be pointed north (indicated by the letter N).

Now let us arbitrarily station an observer 0 at a compass bearing of theta relative to the beacon 10. In other words, the angle between a line drawn from the center of the beacon pointing north and a line drawn from the center of the beacon to the observer 0, is theta. Now suppose that the observer 0 locates the beacon 10 by sweeping a light beam or radar beam 28 across the horizon until he detects the pulsating reflections from the successive corner reflectors 19 of the drum 18. Once the beacon is located, the observer keeps the beam 28 trained on the beacon 10. Under the conditions illustrated in FIG. 4A, the beam 28 will arrive at an angle of incidence theta relative to the axes A1 and A2, which is also a compass bearing of theta relative to the beacon 10. The reflected beam 30 will go off at an angle of reflection theta relative to the axes A1 and A2, or a compass bearing of 360° minus theta. In other words, unless the axis of reflection A1 or A2 of one of the wedge reflectors R1 or R2 is pointed directly at the observer 0, the beam 28 will not be reflected back along its path of incidence, and therefore the observer 0 will not detect any reflection from either of the wedge reflectors R1 and R2.

FIG. 4B illustrates the situation which occurs some time later after the faster moving wedge reflector R2 has rotated in the angular direction indicated by arrow 32 through an angle of theta relative to the position of FIG. 4A. Accordingly, its axis of reflection A2 is now momentarily pointed directly at the observer 0. As a result, the incident beam from observer 0 is reflected back by reflector R2 as beam 34 along the same path, and a brief reflection is detected by the observer. If the angular velocities of reflectors R2 and R1 are in a 2:1 ratio, then reflector R1 will have rotated exactly half as far as reflector R2 from the original position of alignment shown in FIG. 4A. Therefore, if R2 has rotated through an angle of theta, R1 must have rotated through an angle of one-half theta.

FIG. 4C shows the situation at a still later time when reflector R1 has rotated through another angular increment of one-half theta since the condition illustrated in FIG. 4B. Accordingly, the total displacement of reflector R1 is now theta relative to the position of FIG. 4A. As a result, its axis of reflection A1 is now momentarily pointed directly at the observer 0, and the faster moving reflector R2 has moved on so that its axis of reflection A2 is no longer pointed at the observer 0. Therefore the beam from the observer will arrive along the axis A1 and will be reflected back by reflector R1 as beam 36 along the same axis, so that a brief reflected pulse is detected by the observer 0. It will be appreciated that the time interval between the pulses from the faster reflector R2 and the slower reflector R1 is the same time interval which it takes for the conditions depicted in FIG. 4B to change into the conditions depicted in FIG. 4C. In other words, the time interval between the R2 and R1 reflections is equal to the time which it takes the slower reflector R1 to rotate through an angle of one-half theta or for the faster reflector R2 to rotate through an angle of theta.

If the observer knows the angular velocities of the reflectors R1 and R2, then he can compute the angle theta from a measurement of the time interval between the R2 reflection and the R1 reflection. If the observer also knows the particular compass direction, (i.e., north) along which the axes A1 and A2 are pointed when they periodically rotate into parallel relationship with each other, then the angle theta is a compass bearing relative to a line pointing in that direction, in this case north, and passing through the beacon 10. Thus, the observer 0 can measure the interval between the R2 and R1 reflections and from the result compute his compass bearing relative to beacon 10.

Heretofore the art has assumed that, in order to deduce bearing in this manner, the observer had to be able to distinguish the two rotating devices R1 and R2 on the basis of different frequencies, as in the Erben device discussed above; otherwise one might confuse the interval from R1 to R2 with the interval from R2 to R1, resulting in a wrong bearing calculation. But the present invention demonstrates that the order of reflections or responses can be determined and the bearing calculated unambiguously without relying on frequency differences, provided the beacon is observed for one to two cycles. (A cycle is defined as one full rotation of the slower rotating device, or two rotations of the faster one.) The fact that beacon operability is not dependent upon frequency coding is of particular importance in relation to the embodiment of FIGS. 1 through 4, since reflectors R1 and R2 can reflect only the particular frequency with which they are interrogated. Hence frequency coding to distinguish R1 from R2 is not possible.

The manner in which sufficiently prolonged observation of the beacon of this invention resolves the reflector identity problem is best explained in connection with FIGS. 10 through 12. FIG. 10 is a diagram of the occurrence of responses, e.g., reflections from devices R1 and R2, as a function of time. Time increases along the horizontal axis 200, and the vertical axis 202 marks time zero, the moment at which a north-oriented coincidence of rotating devices R1 and R2 last occurred.

As seen in FIG. 10(A), which illustrates the response timing pattern for an observer at a compass bearing of 90° to the beacon, the faster rotating device produces the first response 204, which is detectable by the observer at ⅛ of a full beacon cycle after time zero. Then the slower responsive device produces a response 206 at ¼ of a beacon cycle after time zero. This in turn is followed by another response 208 from the faster device ⅝ of a beacon cycle after time zero, or half a beacon cycle after its previous response 204. Next the faster device produces still another response 210, half a cycle after its previous response 208, or a total of 1⅛ beacon cycles after time zero. Finally, the second response 212 from the slower responsive device occurs at 1¼ beacon cycles after time zero, a full beacon cycle after its previous response 206. Thereafter, the illustrated response pattern is repeated for each subsequent beacon cycle.

FIG. 11(A) is a diagram matched to FIG. 10(A), and showing the time intervals between the consecutive responses 204 through 212 thereof for a 90° compass bearing. It is the time duration of certain of these intervals which actually conveys bearing information. Specifically, in the case of an observer at 90°, FIG. 11(A) shows that during each beacon cycle there is a first interval 214 (between responses 204 and 206), a second interval 216 (between responses 206 and 208), a third interval 218 (between responses 208 and 210) and an interval 220 (between responses 210 and 212) which represents the start of the next beacon cycle.

FIGS. 10(B) and 11(B) are a similar pair of matched diagrams relating to a bearing of 180°, as are FIGS. 10(C) and 11(C) for a bearing of 270° and FIGS. 10(D) and 11(D) for a bearing of 360° or 0°. When all these diagrams are read in the same way that we have read FIGS. 10(A) and 11(A), FIG. 11 reveals that, at any bearing, each beacon cycle results in a repeating pattern of three successive time intervals designated 1, 2 and 3 respectively.

In FIGS. 12(A) through (D) the graphs of FIG. 11(A) through (D) are duplicated but the four interval patterns are aligned with each other so that they all appear to start at the same point in time, marked by vertical line 222. This manipulation translates the time interval pattern into the frame of reference of the observer, who of course initially does not know his bearing and thus could not relate the pattern of time intervals to any absolute starting point such as the beginning of a beacon cycle (vertical line 202 in FIGS. 10 and 11). Instead the observer merely measures time from the first beacon response which he chances to observe, e.g., response 204 in FIG. 10(A), which will not coincide with the beginning of a beacon cycle for any observer bearing except north. Thus, lining up the time interval diagrams of FIG. 11 in the manner of FIG. 12 renders them comparable, so that the reader can readily perceive the information-conveying pattern differences which would appear to observers located at different compass bearings.

Figure 12:
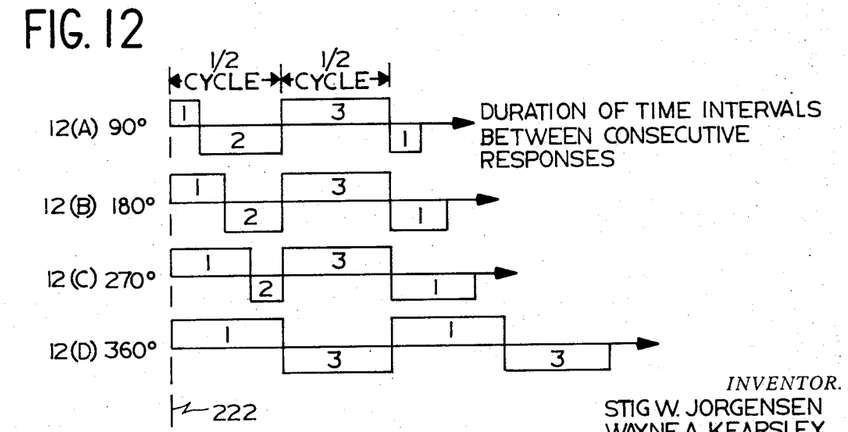
FIGS. 12(A) through (D) are repetitions of FIGS. 11(A) through (D) respectively, but with the time scale of each diagram shifted to start with response No. 1 to present the resulting time interval patterns on a comparable basis.

FIG. 12 clearly reveals that, at any compass bearing, interval No. 3 of the repeating pattern is exactly half a cycle in duration, a fact which follows necessarily because interval No. 3 is always an uninterrupted interval between two consecutive responses (e.g., 208 and 210), both of which come from the faster rotating device, which has an inherent repetition rate of two per cycle. Thus, the fixed duration of interval No. 3 can convey no information which varies in dependence upon the bearing of the observer. However, the relative durations of intervals Nos. 1 and 2 do vary as a function of compass bearing. For example, the relative duration of intervals 214 and 216 is variable according to the timing of response 206 (from the slower rotating device) between the responses 204 and 208 (from the faster rotating device). It is this variable information from which the bearing of the observer can be deduced (once the responses 204, 206 and 208 are identified as to origin). Specifically, in FIG. 12(A) is seen that an easterly compass bearing produces a relatively short interval No. 1 followed by a relatively long interval No. 2, while FIG. 12(B) reveals that a southerly compass bearing produces equal time durations of intervals Nos. 1 and 2, and FIG. 12(C) reveals that a westerly bearing is represented by a longer interval No. 1 and a shorter interval No. 2. Evidently, the sum of the duration of intervals Nos. 1 and 2 is a fixed length of time, but the way in which that length of time is split into two parts (intervals Nos. 1 and 2) is a function of bearing. Finally, FIG. 12(D) reveals that a northerly compass bearing is a degenerate case, in which interval No. 1 has expanded to a maximum, reducing interval No. 2 to zero.

Moreover, FIGS. 12(A) through (C) reveal that the fixed length interval No. 3 serves as a convenient marker which not only identifies itself by its greater length, but also unambiguously identifies intervals Nos. 1 and 2, since interval No. 1 is the interval succeeding interval No. 3, while interval No. 2 is the one which precedes interval No. 3. Once the identity of intervals Nos. 1 and 2 is definitely determined in this manner, an observer located anywhere between 0° and 360° can determine his compass bearing from their relative durations in the manner described. In the limiting case of a 0° or 360° bearing, interval No. 2 vanishes to zero and interval No. 1 equals interval No. 3 in duration, that particular pattern of time intervals being quite unambiguous.

Now that an unambiguous method of determining bearing has been explained in detail, the utility of the drum 18 with its pulsating reflections from the corner reflectors 19 can be more fully appreciated. In addition to helping in the initial location of the beacon 10 by the observer 0, it enables the observer to track the beacon continuously as the observer travels on, for example, if the observer is aboard a moving ship or other vehicle. Such location and tracking of the beacon enable its relative position to be known at all times with considerable precision, hence the interrogation signals and the field of view scanned for reflections can both be limited to a narrow angle without risk of losing contact. This narrow angle has twin advantages. First it limits the area over which the interrogating signal must be swept, thus minimizing the likelihood that the interrogating signal will reveal the presence and location of the observer 0 to an enemy, in military applications. Second, limiting the field of view scanned for responses limits the amount of background interference received, and thereby increases the signal-to-noise ratio for reflected responses. This in turn enables lower signal power to be used for interrogation, which has the advantages of equipment and power economies, as well as still further minimizing the risk of detection of the observer 0 by an enemy. It will also be apparent that the present invention may be practiced using a combination of energy forms. For example, the corner reflectors 19 may operate in the infrared region of the spectrum while the reflectors R1 and R2 operate in the microwave region.

Unlike the system of the Erben patent, with the present system the observer 0 can also determine his range from the beacon 10. He can measure the time it takes for a light or radar beam travelling at a known velocity in air to leave the observer 0 and be reflected back to him from one of the corner reflectors 19 or the wedge reflectors R1 and R2. Then the total round trip path distance can be calculated, and the distance from the observer 0 to the beacon 10 is one-half the total path.

The advantages of the passive reflective beacon 10 over the prior art approach can now be more fully appreciated. As just indicated, echo ranging is possible with a reflective device whereas it is not possible with a beacon which transmits its own signal without any fixed time relationship to an interrogating signal sent by the observer.

Secondly, a better functional and cost distribution is achieved in that the beacon can be a small, inexpensive and even expendable device left in place after its usefulness is terminated. It has no need for bulky, expensive, frequency-coded, high-power-consuming transmitters, since all it does is reflect signals transmitted to it by an observer vehicle, such as a ship which is far better able to carry such transmitter equipment and to provide the large amounts of power which such equipment requires when operated on a high duty cycle basis. In addition, the transmitting equipment aboard the observer ship is not left in an inaccessible location and therefore need not be expendable.

The beacon 10 is also much better adapted for high security applications. A continuously transmitting beacon announces both its presence and its location to friend and foe alike. In contrast, the beacon 10 only responds when interrogated. If no security precautions are needed, it can be used in the visible light portion of the spectrum. If security is a consideration, on the other hand, the shield 16 can be provided with a filter, such as an infrared filter, and the interrogating signal and reflection can both be infrared or some other radiation which matches the filter and is invisible for maximum security. Thus neither the observer 0 nor the beacon 10 need disclose their presence or location during operation.

The basic principle of a "responsive" beacon, i.e., one which does not communicate until interrogated, is applicable to active transmitting devices as well as passive reflecting devices, provided that the active transmitting devices do not transmit continuously. The passive reflectors can be replaced by transponder devices, where the term "transponder" denotes a combined receiver and transmitter device in which the reception of an appropriate interrogation signal by the receiver portion turns on the transmitter portion to issue a reply, and the transmitter portion remains on only so long as the interrogation signal continues to be received by the receiver portion of the combination. Such a device is similar to a reflector in that it is quiescent when no interrogation signal is received, but responds during the time that an interrogation signal is being received, and the response terminates when the interrogating signal terminates.

The analogy between a transponder device and a reflecting device can be carried somewhat further. Transponder devices can be made highly directional so that they respond only to information arriving over a narrow reception path, and they can also be designed to transmit along a highly directional response path. If the transponder device is further arranged so that the narrow reception and transmission paths are coincident, then this path defines the "axis of colinear response" of the transponder, which is analogous to the axis of reflection or normal line of a reflector.

Furthermore, it may require a finite time for an incoming signal to turn on the transmitting portion of the transponder combination to issue a reply, but if that time interval is either known or of negligible duration, then a form of ranging can be done with a transponder type of beacon by measuring the time interval required for the interrogating signal to traverse the distance between the observer and the beacon and for the response signal to make the return trip. Thus, a transponder type of beacon has the same key features and advantages over the prior art as a passive reflector type of beacon, and in addition it can be made to operate with an even higher degree of security for military applications, as will be appreciated from the discussion which follows.

A disadvantage of the transponder system relative to the passive reflective system is that, like the Erben system, some transmission equipment is required aboard the beacon. However, it will be readily appreciated that, because a transponder device only replies in short bursts as opposed to the continuous transmission of prior art beacons, duty cycle considerations are overwhelmingly in favor of the transponder approach because much less power is required and much less stringent demands are made upon the transmitting equipment.

Figure 5:
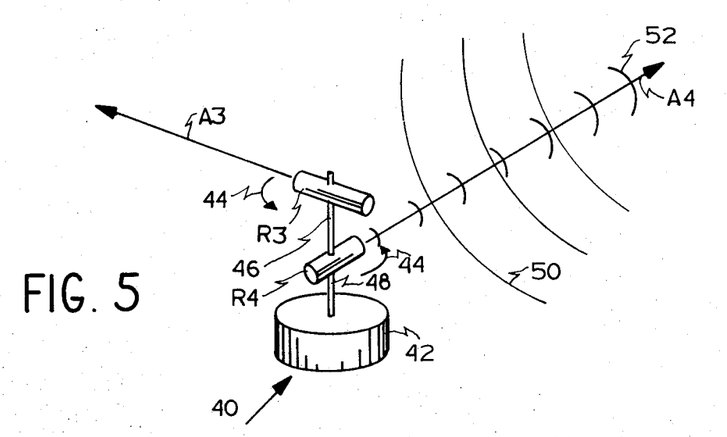
FIG. 5 is a perspective view of another embodiment of a beacon in accordance with this invention, specifically a transponder type of beacon for use with microwave radiation.

In FIG. 5 there is seen an example of a transponder beacon 40. For illustrative purposes, this one operates in the microwave range, although the infrared, visible, and ultraviolet spectral regions can also be used, and a maser or laser device is well adapted for use as the transmitting portion of the transponder. Furthermore, the interrogation and response can employ different frequencies or even entirely different spectral regions if desired, and this approach might have particular utility for high security military applications where an enemy would not know in what two spectral ranges to interrogate and detect the beacon.

Like the beacon of the previous Figures, this one is adapted to be installed in a floating buoy or at any land location. A housing 42 contains a motor and gear train, a power supply, and a compass unit. Transponders R3 and R4 are rotated at different speeds, in the angular direction indicated by arrows 44, by their respective drive shafts 46 and 48 which are concentric. The shafts in turn are driven by the motor and gear train, and the motor is powered by the battery, all within the housing 42. Transponder R4 is driven at an angular velocity of omega and transponder R3 at an angular velocity of one-half omega, while the compass within the housing 40 is effective to make sure that the transponders R3 and R4 are pointing north at those periodic intervals when they are in alignment.

When we speak of the alignment of a transponder, we of course are referring to their respective axes A3 and A4 of colinear response. In other words, transponder R4 receives an incoming signal 50 and responds to that incoming signal only when it is incident along the path defined by the axis A4. During the time that it is receiving such a signal along the path defined by axis A4, the transponder R4 sends back a response 52 along the same path. Both signals are in the microwave region of the frequency spectrum in this particular example, and the technology for making highly directional microwave receiving and transmitting antennas is conventional at the present time. The fact that the receiving and transmitting directions coincide is what establishes the colinearity of response, and this in turn enables the beacon 40 to respond selectively to the location from which the interrogating signal originated. The axis of colinear response A3 bears a similar relation to the other transponder R3.

Figure 6:
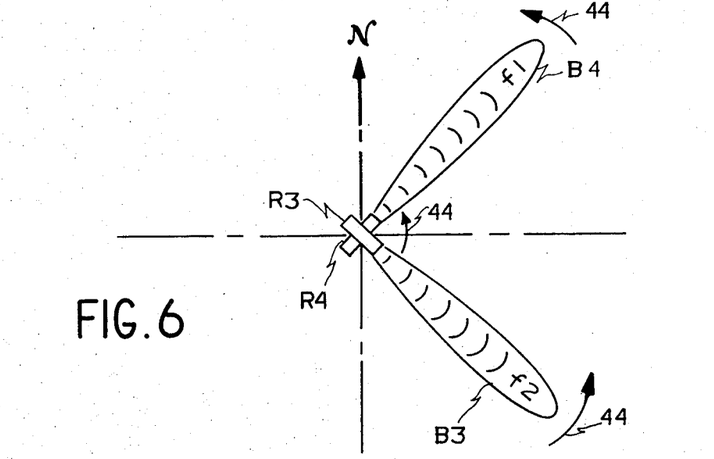
FIG. 6 is a top plan view of the beacon of FIG. 5, showing the radiation pattern thereof.

As seen in FIG. 6, the antenna patterns B3 and B4 of the transponders R3 and R4 respectively are rotated, in the angular direction indicated by arrows 44, about the vertical axis defined by the concentric shafts 46 and 48. However, no actual response is issued by either transponder unless an interrogation signal along the same path is currently being received.

The transponders R3 and R4, like the reflectors R1 and R2 of the previous embodiment, are rotated at different angular velocities, preferably in a 2:1 relationship, so that the time interval between responses detected by an observer gives an indication of angular displacement relative to north, the direction in which the transponders R3 and R4 are facing when they periodically are both pointed the same way.

An additional advantage of the transponder approach is the transponder R4 and R3 can be arranged to transmit at different frequencies $f1$ and $f2$ respectively so that the observer will know immediately, from the frequency of the response, whether it represents the faster moving or the slower moving transponder. As explained above, if the observer measures one to two cycles of rotation of the responsive devices, any ambiguity resolves itself, but it is an advantage of the present embodiment that it provides the additional convenience of immediate self-identification.

The transponder form of this invention is particularly adapted to underwater environments, where of course the signals have to be transmitted in acoustic form at sonic, subsonic or supersonic frequencies. Underwater acoustic beacons in accordance with this invention may find utility in a wide variety of peaceful oceanographic applications, as well as various military underwater demolition missions. The capabilities of the underwater acoustic version of this invention will be described in the context of the latter type of application so as to best illustrate the high degree of security attainable.

Figures 7, 9:
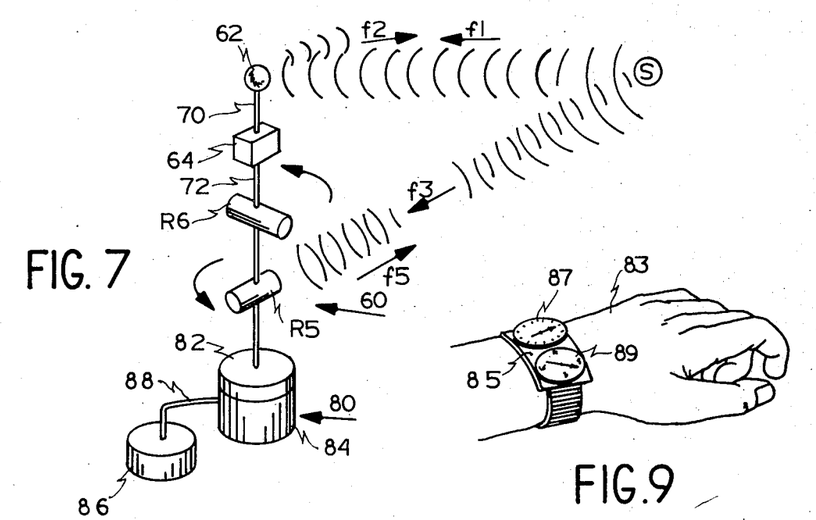
FIG. 7 is a perspective view of another embodiment of a beacon in accordance with this invention, specifically an underwater acoustic beacon.
FIG. 9 is a perspective view of the hand and wrist of a swimmer, who is wearing a combination timepiece and compass instrument for use in underwater navigation according to the method illustrated by FIG. 8.

In FIG. 7 there is seen an underwater acoustic beacon 60 including an omni-directional hydrophone 62, a decoder 64, and a pair of acoustic transponders R5 and R6 rotated at different angular velocities. The omnidirectional hydrophone 62 is supported upon a rod 70 and the decoder 64 upon a rod 72. The transponders R5 and R6 are rotatably driven by respective shafts 76 and 74, the shafts being concentric with each other and with the supporting rod 72.

A base unit 80 includes a housing 82 containing a compass unit for making sure that the axes of colinear response of the transponders R5 and R6 are mutually parallel when pointing north, and a housing 84 containing a drive unit which includes the motor and gear train for driving the transponder shafts 74 and 76 at their appropriate angular velocities. In this embodiment a separate power supply unit 86 is connected by an electrical cable 88 to the drive unit 84 to supply electrical power to the motor therein and to the transponders R5 and R6. Needless to say, all units are hermetically sealed and designed to withstand the high pressure and corrosive characteristics of an undersea environment.

Figure 8:
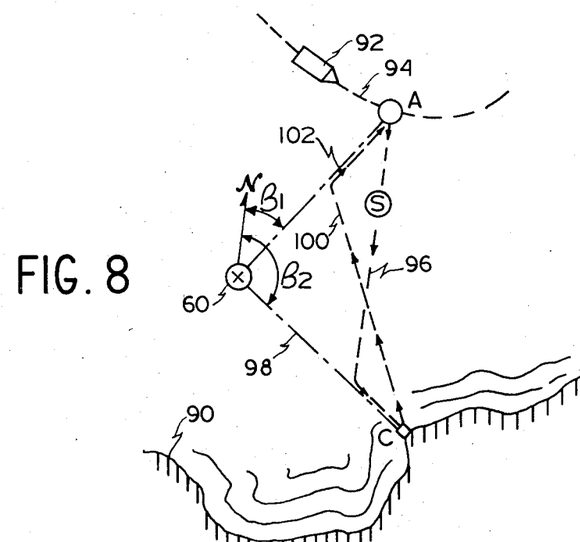
FIG. 8 is a diagram showing the manner in which the beacon of FIG. 7 may be used by a swimmer for underwater navigation.

FIG. 8 shows a typical environment in which the beacon 60 would be employed. There we see a shore line 90 bounding a body of water upon which is a boat 92. The boat 92 wishes to drop off a swimmer S at location A, and the swimmer must then navigate to location C where he will undertake some mission, and then return to be picked up by the boat 92 at location A. For example, the swimmer S may be a member of a UDT team which is going to strike against an enemy shore installation at location C.

Preliminarily, the beacon 60 is dropped, either by a boat or by parachute from an airplane, and it is weighted and anchored by the drive unit within the housing 84 so that it settles to the bottom at the location indicated and remains there. The compass unit 82 then finds the north direction, indicated by the letter N, and turns on the omni-directional hydrophone 62 and decoder 64. However, the drive unit remains turned off by means of a switching device within the housing 84 so as not to rotate the transponders R5 and R6, and the latter are also turned off by that switching device. Thus no motor or gear train noise is generated, and the transponders do not respond to an accidental signal reception, so that no indication of the presence of the beacon is given to an enemy.

At a subsequent time, when the mission is to begin, the boat 92 comes by the area along the path 94. The swimmer S is aboard the boat 92 and is informed of the bearing, angle beta 1, of the drop-off location A relative to the beacon 60 previously set out on the ocean bottom. The swimmer S is also informed of the bearing, angle beta 2, of the target location C relative to the same beacon 60. The swimmer S is then put into the water at the dropoff location A, and has the problem of navigating precisely to the target location C.

The swimmer can solve this problem by swimming in a generally southerly direction, along path 96, guided by a relatively inaccurate compass 89 (FIG. 9) mounted upon a band 85 worn on the wrist 83 of the swimmer S. Eventually, the swimmer can intercept line 98 having a compass bearing of beta 2 relative to the beacon 60, and can swim along the path defined by that line to reach the target location C. Subsequently, after the mission has been accomplished, the swimmer S can return in a generally northerly direction along path 100 until he intercepts line 102 having a compass bearing of beta 1 relative to the beacon 60, and then traverse the path defined by the line until he returns to location A, there to be picked up again by the boat 92.

The boat 92, around the time it drops off the swimmer S at location A, emits an acoustic signal at a frequency $f1$. This can either be an omnidirectional signal, or for greater security it can be a directional signal which is swept in azimuth until the underwater beacon 60 is located. The signal f1 is detected by the omni-directional hydrophone 62 and decoded by the device 64. The coding may be simple frequency coding, i.e., any signal of frequency f1 will be picked up by the hydrophone 62 and trigger a response by the decoder 64, or for applications requiring greater security the signal f1 may be pulse-coded and the decoder 64 arranged to respond only to a predetermined pulse pattern.

If desired, when the hydrophone 62 receives the interrogation signal f1, it can respond with a brief omni-directional reply at a frequency f2 to provide a range indication for those aboard the boat 92. Once the range-indicating signal f2 has been received and the range determined, the interrogation signal f1 and response signal f2 are terminated for security reasons. The enemy can then no longer use the signals f1 and f2 as a means of locating the boat 92 or the beacon 60.

The decoder 64, when it receives the predetermined signal f1 from the hydrophone 62, turns on the switching device in the housing 84. The switching device then activates the transponders R5 and R6 which have been off until now, and it also turns on the drive unit in housing 84 to begin rotating the transponders. Until this time the beacon 60 has remained quiescent so as not to reveal its presence or location in the vicinity of the enemy installation at location C, but now it is put into action, and this can only be done by friendly forces who know the predetermined code signal f1.

At this point the swimmer S has available to him the bearing determination capabilities of the underwater acoustic beacon 60. The swimmer S carries with him, in addition to the wristband 85 bearing the compass 89 and a time-measuring device 87, a small underwater acoustic transmitter having a frequency of f3, and a small acoustic receiver which responds selectively to a frequency f5, or if desired to two frequencies f5 and f6. As the swimmer S proceeds generally south along path 96 according to the relatively inaccurate information gleaned from the wrist compass 89, he interrogates the beacon 60 at intervals to determine his bearing relative thereto. He does this by transmitting the signal at frequency f3 and noting the time interval between the responses from the transponders R5 and R6, which are highly directional both as to their reception path and their response path just as in the case of the previously discussed embodiments.

Depending upon the complexity and weight of the equipment which the swimmer S is to carry, he can either listen through several cycles of information from the beacon 60 to determine which is the R5 response and which is the R6 response, or he can distinguish between them on the basis of different response frequencies f5 and f6 respectively. In either event, the wrist timer 87 is used to determine the time interval between the R5 and R6 responses, and this time interval in turn indicates the swimmer's bearing relative to the underwater beacon 60.

When the swimmer S finds that the bearing is equal to beta 2, he turns left and attempts to keep the same bearing as he proceeds along the path defined by line 98 until he reaches target location C. After accomplishing his mission, he returns in a roughly northerly direction along the path 100 as indicated by the relatively inaccurate compass 89. As he does so, the swimmer S again periodically interrogates the beacon 60 to determine his bearing relative thereto. When the bearing becomes equal to beta 1 the swimmer proceeds along the path defined by line 102, attempting to maintain the same bearing relative to the beacon 60 until he has returned to location A, there to be picked up again by the boat 92.

It will be appreciated that the beacon 60 can then be turned off by the switching device in the housing 84 upon receipt of another command, preferably coded either in frequency or in pulse pattern or both, issued from the ship 92 before it returns to port. Alternatively, a device for measuring a fixed interval can be mounted within the housing 84 and turned on automatically by decoder 64 at the time that the transponders R5 and R6 begin to rotate. At the end of the predetermined time interval, the beacon 60 would be returned automatically to its quiescent state for security reasons. Either way, it will be appreciated that beacon 60 is entirely quiet, i.e., it makes no drive noise for the purpose of rotating the transponders R5 and R6, and it also disables the transponders R5 and R6 from making an accidental response, before and after the mission. It is only when the mission is actually in progress that the beacon 60 is activated so that there is the risk of motor noise or transponder responses being detected by an enemy. Furthermore, the interrogating signals and transponder responses are highly directional and pointed narrowly toward their targets, and they occur only at the time the swimmer S actually requests bearing information by means of an interrogating signal.

For additional security, the transponder embodiments of FIGS. 5 through 8 can be provided with various phase shift techniques which would tend to throw off the track any enemy who tries to use the bearing indication provided by the beacon as a means of finding and destroying it. Specifically, if there is a predetermined intentional delay time between the receipt of an interrogating signal by the receiver portion of one of the transponders and the subsequent issuance of a response by the transmitter portion thereof, and if this delay time is known only to friendly forces, than an enemy would be affirmatively misled in attempting to deduce bearing information from the time interval between the two successive transponder responses. This is another significant security advantage which the responsive beacon system of this invention has over continuously operating bearing-indication beacons which would have the effect of announcing their presence and location continuously to any enemy in the vicinity.

Therefore, it will now be appreciated that the responsive beacon of the present invention, either in its reflective or transponding form, provides significant advantages over 100% duty cycle systems, in terms of providing a range indication and superior functional and cost distribution, as well as better security for military applications. In particular, the transponder embodiments have especially good security characteristics because of the availability of pulse and frequency coding, and of phase shift techniques which provide enemy forces with an incorrect indication of bearing.

The invention claimed is:

1. A responsive navigation beacon comprising:

A. a pair of directional responders each having an axis of colinear response and responding to and transmitting acoustic signals anywhere in the range from subsonic through supersonic frequencies inclusive;
B. each of said transponders arranged to
  1. respond only to a signal arriving along a narrow path, and
  2. to transmit a response only along said narrow path in the opposite direction and only while said signal is being received;
C. motive means being normally off and arranged to rotate both said directional responders about a common axis at angular velocities of omega and 1/C times omega respectively, where C is substantially a constant;
D. means for directionally orienting said beacon so that said colinear response axes periodically rotate into mutually parallel relationship when pointed in a predetermined direction;
E. an omni-directional hydrophone on said beacon responsive to acoustic signals in said frequency range;
F. means for turning said motive means on in response to reception of a predetermined acoustic signal by said omnidirectional hydrophone;
G. and means for turning said motive means off again thereafter.

2. A beacon as in claim 1 further comprising:
a decoder responsive to said omni-directional hydrophone and arranged to recognize a predetermine coded signal and to turn on said motive means in selective response thereto.

3. A beacon as in claim 2 further comprising:
means responsive to said decoder to activate said turn-off means to turn off said motive means in response to reception of a second predetermined coded signal by said hydrophone.

4. A beacon as in claim 3 further comprising:
a timer in said beacon arranged to
  A. start in response to reception of said predetermined signal by said hydrophone,
  B. measure out a predetermined time interval after starting, and
  C. activate said turn-off means to turn off said motive means at the end of said time interval.

* * * * *